US012640494B2

(12) United States Patent
Liu et al.

(10) Patent No.: US 12,640,494 B2
(45) Date of Patent: May 26, 2026

(54) TIGHTLY COUPLED ARRAY ANTENNA AND NETWORK DEVICE

(71) Applicant: HUAWEI TECHNOLOGIES CO., LTD., Shenzhen (CN)

(72) Inventors: Xianglong Liu, Shenzhen (CN); Guanxi Zhang, Shanghai (CN); Zhaoyang Tang, Shenzhen (CN); Yanlin Zou, Xi'an (CN); Dong Chen, Xi'an (CN); Guodong Zhao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 18/342,445

(22) Filed: Jun. 27, 2023

(65) Prior Publication Data

US 2023/0420848 A1 Dec. 28, 2023

Related U.S. Application Data

(63) Continuation of application No. PCT/CN2021/141593, filed on Dec. 27, 2021.

(30) Foreign Application Priority Data

Dec. 31, 2020 (CN) ........................ 202011636498.2

(51) Int. Cl.
*H01Q 21/06* (2006.01)
*H01Q 5/321* (2015.01)
(Continued)

(52) U.S. Cl.
CPC ........... *H01Q 21/062* (2013.01); *H01Q 5/321* (2015.01); *H01Q 5/335* (2015.01); *H01Q 5/385* (2015.01); *H01Q 9/285* (2013.01)

(58) Field of Classification Search
CPC .. H01Q 1/36; H01Q 1/38; H01Q 5/30; H01Q 5/307; H01Q 5/321; H01Q 5/335;
(Continued)

(56) References Cited

U.S. PATENT DOCUMENTS 10,320,088 B1 * 6/2019 Johnson .................. H01Q 9/16
2018/0040955 A1 * 2/2018 Vouvakis ............... H01Q 9/065
2020/0169009 A1 * 5/2020 Kolitsidas ............ H01Q 21/062

FOREIGN PATENT DOCUMENTS

CN 203300808 U 11/2013
CN 109216940 A 1/2019
(Continued)

OTHER PUBLICATIONS

Justin A. Kasemodel,et al.,"Broadband Planar Wide-Scan Array Employing Tightly Coupled Elements and Integrated Balun",2010 IEEE,Jun. 30, 2010,total 6 pages.
(Continued)

*Primary Examiner* — Robert Karacsony

(57) ABSTRACT

A tightly coupled array antenna and a network device are provided. The tightly coupled array antenna includes a first dielectric slab and a plurality of antenna units printed on a lower surface of the first dielectric slab. Each of the antenna units includes a plurality of dipole antennas that are disposed at intervals. Oscillator arms of the dipole antennas are partially hollowed out to reduce both capacitance formed between the oscillator arms and the first dielectric slab and the cross-sectional area of a current path. A plurality of coupling structures is provided on an upper surface of the first dielectric slab so that each of the antenna units is electrically connected to one coupling structure.

17 Claims, 12 Drawing Sheets

(51) Int. Cl.
*H01Q 5/335* (2015.01)
*H01Q 5/385* (2015.01)
*H01Q 9/28* (2006.01)

(58) Field of Classification Search
CPC ........ H01Q 5/378; H01Q 5/385; H01Q 5/392; H01Q 5/49; H01Q 9/16; H01Q 9/28; H01Q 9/285; H01Q 21/062; H01Q 21/24; H01Q 21/26
See application file for complete search history.

(56) References Cited

FOREIGN PATENT DOCUMENTS

| | | | |
|---|---|---|---|
| CN | 109904593 | A | 6/2019 |
| CN | 110707421 | A | 1/2020 |
| CN | 112038758 | A | 12/2020 |
| WO | 2018107931 | A1 | 6/2018 |

OTHER PUBLICATIONS

Dimitrios K. Papantonis et al:"Tunable band rejection of wideband arrays using digital variable capacitors",2016 IEEE International Symposium on Antennas and Propagation (APSURSI),XP032984216,Jun. 26, 2016,total 2 pages.
Jonathan P.et al.,"A Wideband, Wide Scanning Tightly Coupled Dipole Array With Integrated Balun (TCDA-IB)",IEEE Transactions on Antennas and Propagation,Jun. 7, 2013,total 12 pages.
Kolitsioas C 1 et al:"Exploiting asymmetry in a capacitively loaded strongly coupled dipole array", 2014 IEEE Loughborough Antenn\1. Ano Propag. Conf. (LAPC),XP032714106,Nov. 10, 2014,total 4 pages.
Markus Novak.et al.,"Dual Polarized Tightly Coupled Dipole Array (TCDA) for UHF to Millimeter Wave Applications", AP-S,May 30, 2014,total 1 pages.
Jingni Zhong.et al.,"Dual-Linear Polarized Phased Array With 9:1 Bandwidth and 60° Scanning Off Broadside",IEEE Transactions on Antennas and Propagation,Jan. 9, 2019,total 6 pages.

* cited by examiner

TIGHTLY COUPLED ARRAY ANTENNA AND NETWORK DEVICE

CROSS-REFERENCE TO RELATED APPLICATIONS

This application is a continuation of International Application No. PCT/CN2021/141593 filed on Dec. 27, 2021, which claims priority to Chinese Patent Application No. 202011636498.2 filed on Dec. 31, 2020. The disclosures of the aforementioned applications are hereby incorporated by reference in their entireties.

TECHNICAL FIELD

This disclosure relates to the field of mobile communications, and in particular, to a tightly coupled array antenna and a network device.

BACKGROUND

As an important part of a modern wireless communications system, an antenna plays a role of mutual conversion between a guided wave on a transmission line and an electromagnetic wave in free space to implement radio transmission of an electromagnetic signal between any two points. An array antenna, which includes multiple antenna monomers in a specific arrangement manner, can make use of the superposition of electromagnetic waves to strengthen a radiation signal in a specific direction and is widely used in various fields where the antenna monomers may be considered as a monomer device that can implement a function of mutual conversion between a guided wave and an electromagnetic wave.

The array antenna is widely used because of a high gain of the array antenna. However, since the array antenna integrates multiple antenna monomers into one device, a strong coupling effect is generated between the antenna monomers. Consequently, the antenna monomers cannot work properly. Using a small quantity of antenna monomers in the array antenna can achieve an objective of reducing the coupling effect between the antenna monomers. Using the small quantity of antenna monomers in the array antenna requires the array antenna to have an ultra-wide bandwidth to meet requirements of different frequency bands.

Some scholars have prepared a tightly coupled array antenna with a wide bandwidth by closely arranging dipoles of the antenna monomers. However, most of the work on the tightly coupled array antenna that has been published currently has focused on how to obtain a wider bandwidth, and for an important parameter of an active standing wave, a value less than 3.0 is usually used as a standard. For a specific application scenario, for example, when a tightly coupled array antenna is used for a 5G mobile communications base station antenna system, it is not only expected that the tightly coupled array antenna still has a wide bandwidth, but also has a higher requirement on a parameter of an active standing wave. How to reduce the active standing wave of the tightly coupled array antenna has become a technical problem to be resolved urgently.

SUMMARY

According to a first aspect, this disclosure provides a tightly coupled array antenna, including:

a first dielectric slab, where a plurality of antenna units are disposed on a lower surface of the first dielectric slab;

each of the antenna units includes at least two dipole antennas, and each of the dipole antennas includes two symmetrically disposed oscillator arms; the oscillator arms are partially hollowed out; and a plurality of coupling structures are disposed on an upper surface of the first dielectric slab, and each of the coupling structures is electrically connected to one of the antenna units.

In this implementation, the tightly coupled array antenna includes at least the first dielectric slab. The plurality of dipole antennas are disposed on the lower surface of the first dielectric slab. The oscillator arms of the dipole antennas are partially hollowed out. The oscillator arms of the dipole antennas are designed to be partially hollowed out, so that a capacitance formed between the oscillator arms and the first dielectric slab is reduced, and a cross-sectional area of a current path is also reduced to increase an impedance real part, thereby achieving an objective of reducing an active standing wave of the tightly coupled array antenna.

With reference to the first aspect, in a first possible implementation, the tightly coupled array antenna further includes: a second dielectric slab, disposed in parallel above the first dielectric slab, where a plurality of parasitic patches are disposed on an upper surface of the second dielectric slab, and a center of each of the parasitic patches coincides with a center of each of the coupling structures in a vertical direction.

In this implementation, each of the parasitic patches is loaded on each of the coupling structures, which is equivalent to introducing an inductance component, where the inductance component can offset a capacitive reactance of the antenna unit, so that the impedance real part of the tightly coupled array antenna is smoother, and the active standing wave is reduced.

With reference to the first aspect, in a second possible implementation, the tightly coupled array antenna further includes: a third dielectric slab, disposed on the lower surface of the first dielectric slab and perpendicular to the first dielectric slab, where a feeding microstrip is disposed on a first surface of the third dielectric slab, the first surface is perpendicular to the first dielectric slab, and a microstrip floor is disposed on a second surface of the third dielectric slab, the second surface is perpendicular to the first dielectric slab, the feeding microstrip and the microstrip floor form a balun structure, and each of the balun structures is electrically connected to one of the dipole antennas.

In this implementation, the feeding microstrip and the microstrip floor form the balun structure, and the balun structure can achieve an objective of balanced feeding and impedance matching so that the active standing wave of the tightly coupled array antenna can be reduced.

With reference to the first aspect, in a third possible implementation, the microstrip floor is partially hollowed out.

In this implementation, the microstrip floor is designed to be partially hollowed out so that a diversity of current flowing on the microstrip floor can be increased, and the cross-sectional area of the current path can also be reduced to increase the impedance real part, thereby achieving the objective of reducing the active standing wave of the tightly coupled array antenna.

With reference to the first aspect, in a fourth possible implementation, the tightly coupled array antenna further includes: a reflection floor, disposed in parallel below the first dielectric slab, where the reflection floor is electrically connected to the balun structure.

In this implementation, the reflection floor not only can reflect and gather, on a receiving point, a signal received by the dipole antennas, which greatly enhances a receiving capability of the antennas and can achieve an objective of unidirectional radiation of dipole antenna signals, the reflection floor can also play a role of blocking and shielding other radio wave interference from the back of the reflection floor.

With reference to the first aspect, in a fifth possible implementation, the coupling structure includes a first feeding plate and a second feeding plate, and the first feeding plate and the second feeding plate are disposed perpendicularly to each other.

In this implementation, an included angle between the first feeding plate and the second feeding plate is 90 degrees, so that the antenna unit has a good dual-polarization characteristic, and an interference is reduced.

With reference to the first aspect, in a sixth possible implementation, the upper surface of the first dielectric slab is spaced apart from the lower surface of the second dielectric slab by a preset distance.

In this implementation, a preset distance between the upper surface of the first dielectric slab and the lower surface of the second dielectric slab is equivalent to introducing the capacitance component, and the capacitance component can enable the tightly coupled array antenna to exhibit an ultra-wideband characteristic.

According to a second aspect, this application provides a tightly coupled array antenna, including:

- a first dielectric slab, where a plurality of antenna units are disposed on a lower surface of the first dielectric slab, each of the antenna units includes at least two dipole antennas, and each of the dipole antennas includes two symmetrically disposed oscillator arms; a plurality of coupling structures are disposed on an upper surface of the first dielectric slab, and each of the coupling structures is electrically connected to one of the antenna units; and
- a second dielectric slab, disposed in parallel above the first dielectric slab, where a plurality of parasitic patches are disposed on an upper surface of the second dielectric slab, and a center of each of the parasitic patches coincides with a center of each of the coupling structures in a vertical direction.

In this implementation, each of the parasitic patches is loaded on each of the coupling structures, which is equivalent to introducing an inductance component, where the inductance component can offset a capacitive reactance of the antenna unit so that the impedance real part of the tightly coupled array antenna is smoother, and the active standing wave is reduced.

With reference to the second aspect, in a first possible implementation, the tightly coupled array antenna further includes:

- a third dielectric slab, disposed on the lower surface of the first dielectric slab and perpendicular to the first dielectric slab, where a feeding microstrip is disposed on a first surface of the third dielectric slab, the first surface is perpendicular to the first dielectric slab, and a microstrip floor is disposed on a second surface of the third dielectric slab, the second surface is perpendicular to the first dielectric slab, a bottom end of the feeding microstrip is electrically connected to a bottom end of the microstrip floor.

In this implementation, the feeding microstrip and the microstrip floor form the balun structure, and the balun structure can achieve an objective of balanced feeding and impedance matching, so that the active standing wave of the tightly coupled array antenna can be reduced.

With reference to the second aspect, in a second possible implementation, the microstrip floor is partially hollowed out.

In this implementation, the microstrip floor is designed to be partially hollowed out, so that a diversity of current flowing on the microstrip floor can be increased, and the cross-sectional area of the current path can also be reduced to increase the impedance real part, thereby achieving the objective of reducing the active standing wave of the tightly coupled array antenna.

According to a third aspect, a network device is provided that includes the tightly coupled array antenna provided in the first aspect or the tightly coupled array antenna provided in the second aspect.

In this implementation, the network device includes the tightly coupled array antenna. The tightly coupled array antenna includes at least the first dielectric slab. The plurality of dipole antennas are disposed on the lower surface of the first dielectric slab. The oscillator arms of the dipole antennas are partially hollowed out. The oscillator arms of the dipole antennas are designed to be partially hollowed out, so that a capacitance formed between the oscillator arms and the first dielectric slab is reduced, and a cross-sectional area of a current path is also reduced to increase an impedance real part, thereby achieving an objective of reducing an active standing wave of the tightly coupled array antenna. Alternatively, the tightly coupled array antenna includes a first dielectric slab and a second dielectric slab, where a plurality of antenna units are disposed on a lower surface of the first dielectric slab, a plurality of coupling structures are disposed on an upper surface of the first dielectric slab, and each of the antenna units is electrically connected to one of the coupling structures; and a plurality of parasitic patches are disposed on an upper surface of the second dielectric slab, a center of each of the parasitic patches coincides with a center of each of the coupling structures in a vertical direction, and each of the parasitic patches is loaded on each of the coupling structures, which is equivalent to introducing an inductance component, where the inductance component can offset a capacitive reactance of the antenna units so that an impedance real part of the tightly coupled array antenna is smoother, and the active standing wave is reduced.

REFERENCE NUMERALS

1: first dielectric slab; 11: antenna unit, 111: dipole antenna, 12: coupling structure, 121: first feeding plate, 122: second feeding plate; 2: second dielectric slab, 21: parasitic patch; 3: third dielectric slab; 31: feeding microstrip, 32: microstrip floor, 33: gap structure, 34: limiting protrusion; 4: reflection floor.

DESCRIPTION OF EMBODIMENTS

Figure 1:
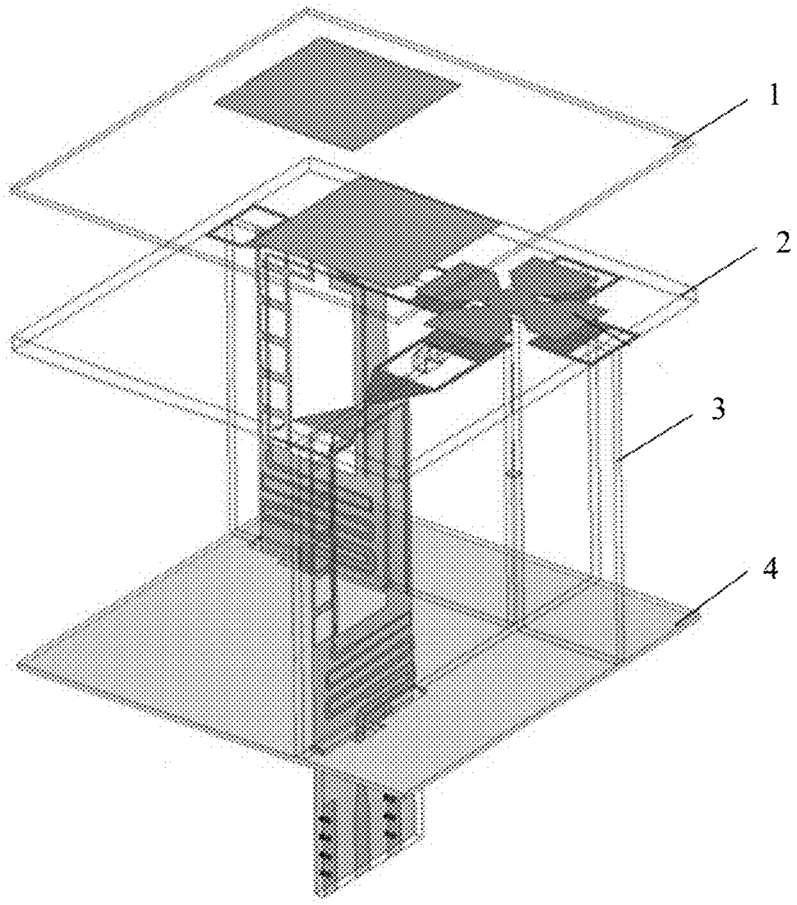
FIG. 1 is a schematic structural diagram of a tightly coupled array antenna according to an embodiment.

To reduce an active standing wave of a tightly coupled array antenna, a first aspect of embodiments of this disclosure provides a tightly coupled array antenna with a new structure. FIG. 1 is a schematic structural diagram of a tightly coupled array antenna according to an embodiment. In a technical solution provided in this embodiment, the tightly coupled array antenna includes at least a first dielectric slab 1. A plurality of dipole antennas 111 are disposed on a lower surface of the first dielectric slab 1, and oscillator arms of the dipole antennas 111 are partially hollowed out. The oscillator arms of the dipole antennas 111 are designed to be partially hollowed out so that a capacitance formed between the oscillator arms and the first dielectric slab 1 is reduced, and a cross-sectional area of a current path is also reduced to increase an impedance real part, thereby achieving an objective of reducing an active standing wave of the tightly coupled array antenna. To make the objectives, technical solutions, and advantages of this application clearer, the following further describes this application in detail by taking a non-limiting embodiment as an example.

Figure 2:
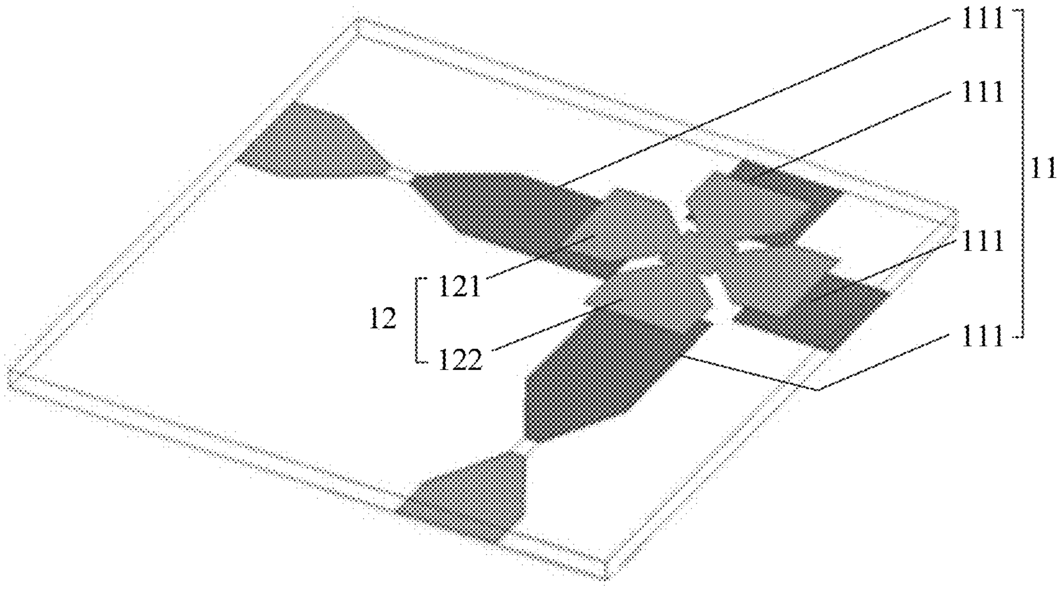
FIG. 2 is a schematic structural diagram of a first dielectric slab according to an embodiment.

FIG. 2 is a schematic structural diagram of a first dielectric slab according to a feasible embodiment. In this embodiment, the first dielectric slab 1 may be but is not limited to a ceramic circuit board, an aluminum oxide ceramic circuit board, an aluminum nitride ceramic circuit board, a circuit board, a printed circuit board (PCB), an aluminum substrate, a high frequency board, a copper plate, an impedance board, an ultra-thin circuit board, an ultra-thin circuit board, a printed circuit board, etc. For example, in a feasible embodiment, the first dielectric slab 1 may be Rogers RO4350. A shape of the first dielectric slab 1 may be set based on requirements. For example, in a feasible embodiment, the first dielectric slab 1 may be a square plate with a side length of 24 mm. A thickness of the first dielectric slab 1 may be set based on requirements. For example, in an embodiment, the thickness of the first dielectric slab 1 may be 0.762 mm. A number of the dipole antennas 111 disposed on the lower surface of the first dielectric slab 1 is not limited in this embodiment. In a real-world application process, an amount of data of the dipole antennas 111 may be set based on requirements. For example, in an embodiment, the amount of data of the dipole antennas 111 may be 4.

In this embodiment, the plurality of dipole antennas 111 are disposed on the lower surface of the first dielectric slab 1. A way of disposing the dipole antennas 111 on the lower surface of the first dielectric slab 1 is not limited in this embodiment, and any way of disposing that can achieve an objective of signal transmission between the dipole antennas 111 and the first dielectric slab 1 may be applied to this embodiment. For example, in some embodiments, the way of disposing may be printing, and in some embodiments, the way of disposing may be photolithography.

Figure 3A:
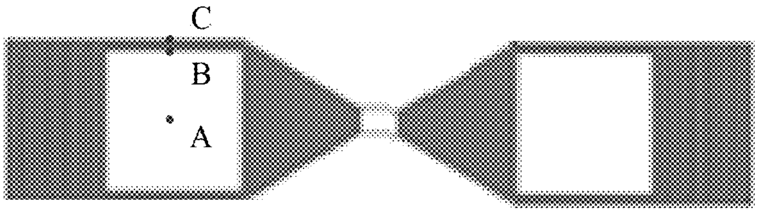
FIG. 3A is a schematic diagram of a dipole antenna according to an embodiment.
Figure 3B:
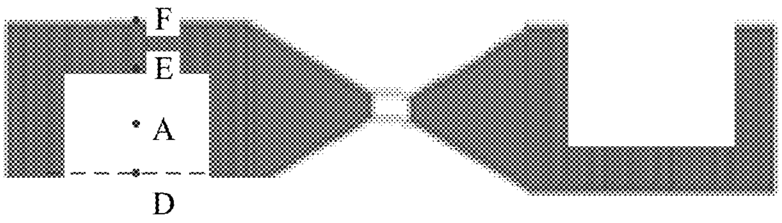
FIG. 3B is a schematic diagram of a dipole antenna according to an embodiment.

In this embodiment, the dipole antennas 111 is provided with two symmetrical oscillator arms to implement 360-degree signal coverage in a horizontal direction. The oscillator arms of the dipole antennas 111 are partially hollowed out and may be construed as follows: At least one of hollows, which penetrates the oscillator arms in a vertical direction, is disposed on each of the oscillator arms, and an area of each of the hollows is less than an area of each of the oscillator arms. In some embodiments, the hollow may be disposed in the oscillator arms, that is, a distance from a center of the hollow to a boundary of all of the hollows is less than a distance from the center of the hollow to a boundary of the oscillator arms in a same direction. For example, FIG. 3A is a schematic diagram of a dipole antenna according to an embodiment. In this embodiment, the hollow is disposed in the oscillator arms. It can be seen from FIG. 3A that a distance from a center point A of the hollow to a boundary point B of the hollow is less than a distance from the center point A of the hollow to a boundary point C of the oscillator arms. This embodiment is merely an illustrative introduction to an application instance where a hollow can be disposed in the oscillator arms. In a real-world application process, an implementation in which the hollow is disposed in the oscillator arms can be, but is not limited to, the foregoing implementations. In some embodiments, the hollow may be disposed at the boundary of the oscillator arms, that is, a distance from the center of the hollow to a boundary of part of the hollows is equal to the distance from the center of the hollow to the boundary of the oscillator arms in the same direction. The distance from the center of the hollow to the boundary of part of the hollow is less than the distance from the center of the hollow to the boundary of the oscillator arms in the same direction. For example, FIG. 3B is a schematic diagram of a dipole antenna according to an embodiment in which the hollow is disposed at the boundary of the oscillator arms. It can be seen from FIG. 3B that a distance from the center point A of the hollow to a boundary point D of the hollow is equal to a distance from the center point A of the hollow to the boundary point D of the oscillator arms. A distance from the center point A of the hollow to a boundary point E of the oscillator arms is less than a distance between the center point A of the hollow to a boundary point F of the oscillator arms. This embodiment is merely an illustrative introduction to an application instance where a hollow can be disposed at the boundary of the oscillator arms. In a real-world application process, an implementation in which the hollow is disposed in the oscillator arms can be, but is not limited to, the foregoing implementations.

A shape of the hollow is not limited in this embodiment. For example, in some embodiments, the shape of the hollow may be a regular polygon. In some embodiments, the shape of the hollow may be a circle. Any shape of the hollow that can play a role of reducing a capacitance formed between the oscillator arms and the first dielectric slab 1 and reducing a cross-sectional area of a current path to increase an impedance real part may be applied to a solution of this embodiment.

Figure 4:
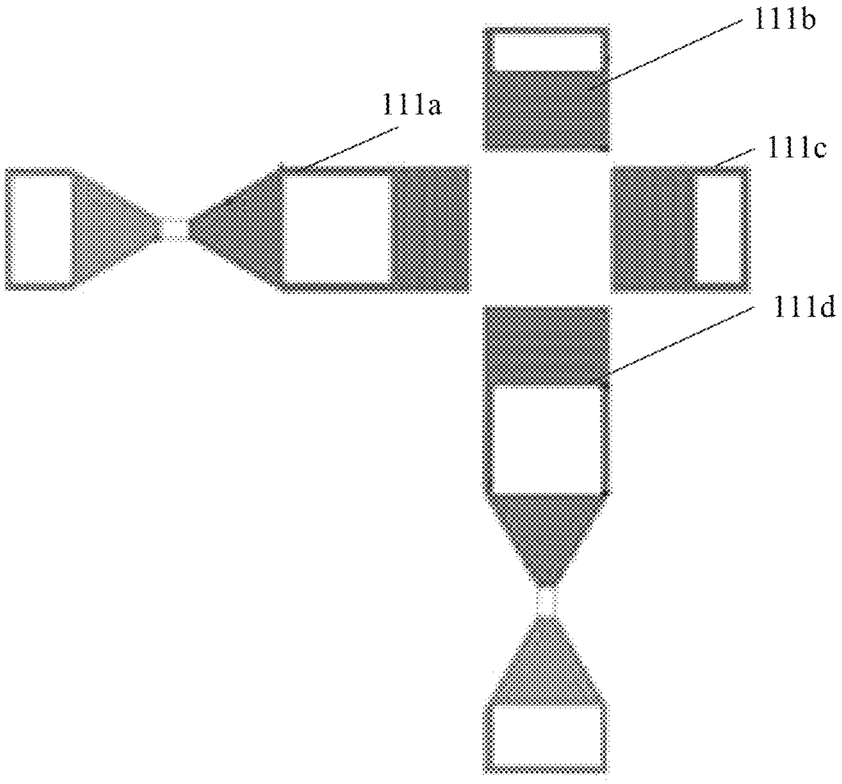
FIG. 4 is a top view of an antenna unit according to an embodiment.

In this embodiment, the dipole antennas 111 are disposed at intervals among each other, that is, the oscillator arms of the dipole antennas 111 are discontinuous. A plurality of dipole antennas 111 disposed at intervals among each other may form one antenna unit 11. For example, FIG. 4 is a top view of an antenna unit according to a feasible embodiment. It can be seen from the figure that dipole antennas (111*a*, 111*b*, 111*c*, and 111*d*) form one antenna unit 11. In some embodiments, the oscillator arms of two dipole antennas inside the antenna unit may be disposed perpendicularly to each other. For example, the oscillator arms of the dipole antennas 111*a* in FIG. 4 are perpendicular to the oscillator arms of the dipole antennas 111*b*. In some embodiments, the oscillator arms of the two dipole antennas inside the antenna unit may be disposed opposite to each other. For example, the oscillator arms of the dipole antennas 111*a* in FIG. 4 are disposed opposite to the oscillator arms of the dipole antennas 111*c*.

In this embodiment, a plurality of coupling structures 12 are disposed on an upper surface of the first dielectric slab 1, and the coupling structures 12 are electrically connected to the antenna unit 11. In some feasible embodiments, each of the coupling structures 12 is electrically connected to one antenna unit 11.

A way of disposing the coupling structures 12 on the upper surface of the first dielectric slab 1 is not limited in this embodiment, and any way of disposing that can achieve an objective of signal transmission between the coupling structures 12 and the first dielectric slab 1 may be applied to this embodiment. For example, in some embodiments, the way of disposing may be printing, and in some embodiments, the way of disposing may be photolithography.

The coupling structures 12 in this embodiment refer to a structure that can receive a radiation signal radiated by coupled antennas 111 inside the antenna unit 11, and generate an induced current. For example, taking the first dielectric slab shown in FIG. 2 as an example (refer to FIG. 4 for a number of an antenna unit). A coupling structure 12 is disposed on an upper surface of the first dielectric slab 1, and the coupling structure 12 may include two feeding plates, where the two feeding plates are respectively a first feeding plate 121 and a second feeding plate 122. In some embodiments, the first feeding plate 121 and the second feeding plate 123 may be connected via one connection portion. One end of the first feeding plate 121 is electrically connected to the oscillator arms of the dipole antennas 111*b*, and the other end of the first feeding plate 121 is electrically connected to the oscillator arms of the dipole antennas 111*d*. One end of the second feeding plate 122 is electrically connected to the oscillator arms of the dipole antennas 111*a*, and the other end of the second feeding plate 122 is electrically connected to the oscillator arms of the dipole antennas 111*c*. In this way, current coupling between the dipole antennas (111*a*, 111*b*, 111*c*, 111*d*) is implemented. Optionally, in some embodiments, an included angle between the first feeding plate 121 and the second feeding plate 122 is 90 degrees, so that the antenna unit 11 has a good dual-polarization characteristic, and an interference is reduced. It should be clear that, the included angle of 90 degrees between the first feeding plate 121 and the second feeding plate 122 is merely a preferred example. In a real-world application process, the included angle between the first feeding plate 121 and the second feeding plate 122 may be set based on requirements.

An electrical connection in this disclosure provides that the tightly coupled array antenna includes a set of electrical loops of electrical products. The electrical products may include antenna units, coupling structures, and the like in this embodiment. Electrical signals or radio waves can be transmitted among electrical products through the electrical connection. For example, the electrical connection between the coupling structure 12 and the antenna unit 11 may implement that the coupling structure 12 receives the radiation signal radiated by the coupled antennas of the antenna unit 11, and the radiation signal generates the induced current on the coupling structure 12, thereby implementing current coupling among the dipole antennas 111 inside the antenna unit 11.

Figure 5:
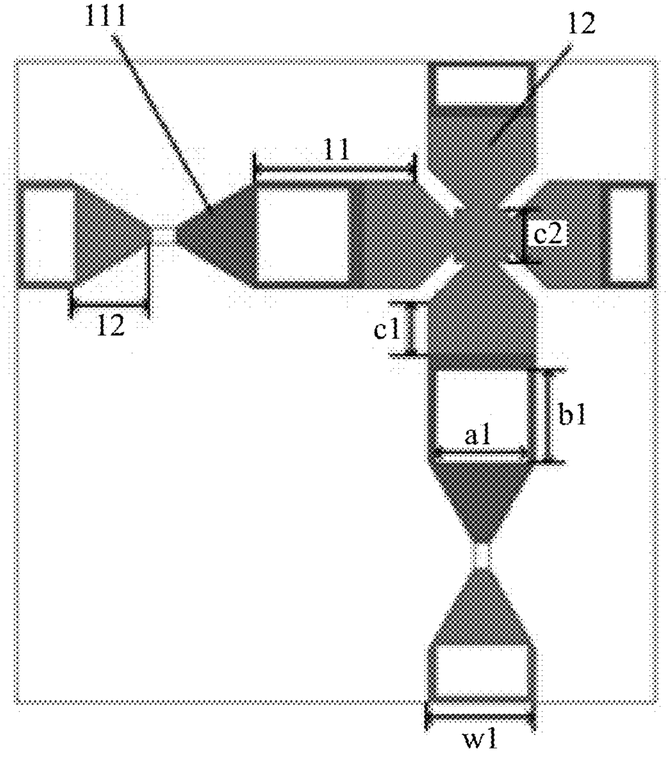
FIG. 5 is a top view of a first dielectric slab according to an embodiment.

The first dielectric slab 1 provided in this embodiment will be further described with reference to specific examples below. Refer to FIG. 5. FIG. 5 is a top view of a first dielectric slab according to a feasible embodiment. In this embodiment, the first dielectric slab 1 may be Rogers RO4350, with a thickness of 0.762 mm and a side length of 24 mm. A plurality of coupling structures 12 are disposed on an upper surface of the first dielectric slab 1, each of the coupling structures 12 includes a first feeding plate 121 and a second feeding plate 122, and the first feeding plate 121 and the second feeding plate 122 are crossed perpendicularly to each other and share a square connecting piece in the middle of the coupling structures 12. The side length c2 of the square connecting piece is 2 mm. A plurality of antenna units 11 are disposed on a lower surface of the first dielectric slab 1, each of the antenna units 11 is electrically connected to one coupling structure 12, a length c1 of a coupling part between the coupling structure 12 and the antenna unit 11 is 2 mm, and a width w1 of the coupling structure 12 is 4 mm. In this embodiment, the dipole antenna 111 is a butterfly-shaped antenna. The dipole antenna 111 is provided with two oscillator arms, and the width of the oscillator arms is equal to the width of the coupling structure 12, which is equal to 4 mm. The oscillator arms include a rectangular part and a V-shaped part. A total length of the oscillator arms is 9 mm, where the length 11 of the rectangular part is 6 mm, and the length 12 of the V-shaped part is 3 mm. A hollowed-out part of each of the oscillator arms is a square, where the side length al is equal to the side length b1, which is equal to 3.5 mm. It should be noted that, a dimension of each of the parts of the first dielectric slab shown in this embodiment is merely a preferred example. In a real-world application process, the dimension of each of the parts of the first dielectric slab may be set based on requirements, and the applicants make no excessive limitation herein.

In the technical solution provided in this application, the tightly coupled array antenna includes at least the first dielectric slab 1. The plurality of dipole antennas 111 are disposed on the lower surface of the first dielectric slab 1. The oscillator arms of the dipole antennas 111 are partially hollowed out. The oscillator arms of the dipole antennas 111 are designed to be partially hollowed out, so that a capacitance formed between the oscillator arms and the first dielectric slab 1 is reduced, and a cross-sectional area of a current path is also reduced to increase an impedance real part, thereby achieving an objective of reducing an active standing wave of the tightly coupled array antenna.

Based on the technical solution described above, the tightly coupled array antenna may further include a second dielectric slab 2. The second dielectric slab 2 is disposed in parallel above the first dielectric slab 1. A plurality of parasitic patches 21 are disposed on an upper surface of the second dielectric slab, and a center of each of the parasitic patches 21 coincides with a center of each of the coupling structures 12 in a vertical direction. In the technical solution shown in this embodiment, each of the parasitic patches 21 is loaded on each of the coupling structures 12, and loading one parasitic patch 21 is equivalent to introducing an inductance component. The inductance component can offset a capacitive reactance of the antenna unit 11, so that an impedance real part of the tightly coupled array antenna is smoother, and the active standing wave is reduced. This is further described below with reference to an embodiment.

Continuing with FIG. 1, in some embodiments, the tightly coupled array antenna may include the first dielectric slab 1 and the second dielectric slab 2. The second dielectric slab 2 is disposed in parallel above the first dielectric slab 1, a plurality of parasitic patches 21 are disposed on an upper surface of the second dielectric slab 2, and a center of each of the parasitic patches 21 coincides with a center of each of the coupling structures 12 in a vertical direction.

In this embodiment, the second dielectric slab 2 may be a ceramic circuit board, an aluminum oxide ceramic circuit board, an aluminum nitride ceramic circuit board, a circuit board, a PCB, an aluminum substrate, a high frequency board, a thick copper plate, an impedance board, an ultra-thin circuit board, an ultra-thin circuit board, a printed circuit board, etc. A shape of the second dielectric slab 2 may be set based on requirements. Alternatively, to achieve an objective of saving space, the shape of the second dielectric slab 2 is the same as the shape of the first dielectric slab 1.

In this embodiment, a type of each of the parasitic patches 21 is not limited, and any parasitic patch that can play an equivalent role of introducing an inductance component may be applied to this embodiment. For example, in some feasible embodiments, each of the parasitic patches 21 may be a metal patch. A shape of each of the parasitic patches 21 is not limited in this embodiment. For example, in some feasible embodiments, each of the parasitic patches 21 may be a regular polygon, and in some feasible embodiments, each of the parasitic patches 21 may be a circle. A way of disposing the parasitic patches 21 on the upper surface of the second dielectric slab 2 is not limited in this embodiment, and any way of disposing that can achieve an objective of signal transmission between the parasitic patches 21 and the second dielectric slab 2 may be applied to this embodiment.

Figure 6:
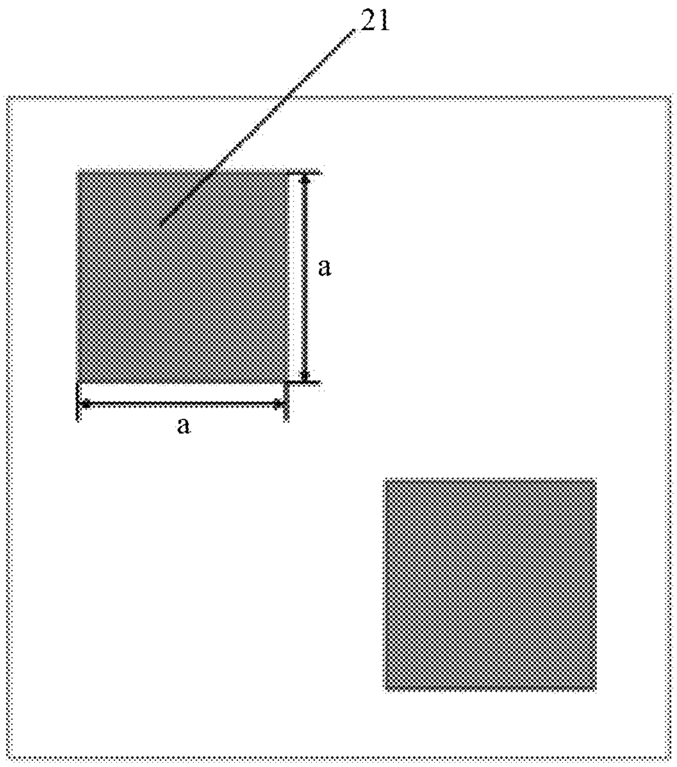
FIG. 6 is a top view of a second dielectric slab according to an embodiment.

The second dielectric slab provided in this embodiment will be further described with reference to specific examples below. Refer to FIG. 6. FIG. 6 is a top view of a second dielectric slab according to a feasible embodiment. The second dielectric slab shown in FIG. 6 and the first dielectric slab shown in FIG. 5 may be assembled to form a tightly coupled array antenna. In this embodiment, the second dielectric slab 2 may be Rogers RO4350, with a thickness of 0.254 mm. A plurality of square parasitic patches 21 are disposed on an upper surface of the second dielectric slab 2, and a side length a of each of the square parasitic patches 21 is 7.6 mm. It should be noted that a dimension of each of the parts of the second dielectric slab shown in this embodiment is merely an example. In a real-world application process, the dimension of each of the parts of the second dielectric slab may be set based on requirements, and the applicants make no excessive limitation herein.

In the technical solution provided in this application, each of the parasitic patches 21 is loaded on each of the coupling structures 12, which is equivalent to introducing an inductance component where the inductance component can offset a capacitive reactance of the antenna unit 11 so that the impedance real part of the tightly coupled array antenna is smoother and the active standing wave is reduced.

Based on the technical solution described above, the upper surface of the first dielectric slab 1 can be spaced apart from the lower surface of the second dielectric slab 2 by a preset distance. In the technical solution provided in this embodiment, the preset distance between the upper surface of the first dielectric slab 1 and the lower surface of the second dielectric slab 2 is equivalent to introducing the capacitance component, and the capacitance component enables the tightly coupled array antenna to exhibit an ultra-wideband characteristic. This is further described below with reference to an embodiment.

Continuing with FIG. 1, in some feasible embodiments, the upper surface of the first dielectric slab 1 is spaced apart from the lower surface of the second dielectric slab 2 by a preset distance, where the preset distance ranges from 6 mm to 10 mm. Specifically, the preset distance between the second dielectric slab 2 shown in FIG. 6 and the first dielectric slab 1 shown in FIG. 5 may be 8 mm. A spacing of 8 mm between the upper surface of the first dielectric slab 1 and the lower surface of the second dielectric slab 2 is equivalent to introducing the capacitance component inside the tightly coupled array antenna, where the capacitance component enables the tightly coupled array antenna to exhibit an ultra-wideband characteristic.

A way of disposing the first dielectric slab 1 and the second dielectric slab 2 is not limited in this embodiment, and any way of disposing that can achieve an objective of enabling the upper surface of the first dielectric slab 1 to be spaced apart from the lower surface of the second dielectric slab 2 by a preset distance may be applied to this embodiment. Optionally, to reduce quality and production cost of the tightly coupled array antenna, in some feasible embodiments, several bolts may be used to support between the first dielectric slab 1 and the second dielectric slab 2.

Based on the technical solution shown above, the tightly coupled array antenna may further include a third dielectric slab 3. A feeding microstrip 31 is disposed on a first surface of the third dielectric slab 3, a microstrip floor 32 is disposed on a second surface of the third dielectric slab 3, and the feeding microstrip 31 and the microstrip floor 32 form a balun structure. In the technical solution provided in this embodiment, the feeding microstrip 31 and the microstrip floor 32 form the balun structure, and the balun structure can achieve an objective of balanced feeding and impedance matching, so that the active standing wave of the tightly coupled array antenna can be reduced. This is further described below with reference to an embodiment.

Continuing with FIG. 1, in some embodiments, the tightly coupled array antenna may include the first dielectric slab 1, a second dielectric slab 2, and the third dielectric slab 3. The third dielectric slab 3 is perpendicular to and connected to the first dielectric slab 1, the feeding microstrip 31 is disposed on the first surface of the third dielectric slab 3, the first surface is perpendicular to the surface of the first dielectric slab 1, and the microstrip floor 32 is disposed on the second surface of the first dielectric slab. The second surface is a surface perpendicular to the first dielectric slab 1, and a bottom end of the feeding microstrip 31 is electrically connected to a bottom end of the microstrip floor 32. In the solution shown in this embodiment, the first surface and the second surface are a same surface of the third dielectric slab. In some embodiments, to achieve an objective of easy processing and simple structure of a designed balun structure, in some feasible embodiments, the first surface and the second surface may be two opposite surfaces of the third dielectric slab.

The feeding microstrip 31 in this disclosure refers to a microstrip that can provide electrical energy and transmit an electrical signal. For example, in some feasible embodiments, the feeding microstrip 31 may be a copper wire. The microstrip floor 32 in this application refers to a floor that may form a balun structure with the feeding microstrip 31. For example, in some feasible embodiments, the microstrip floor 32 may be a metal floor.

Figure 7:
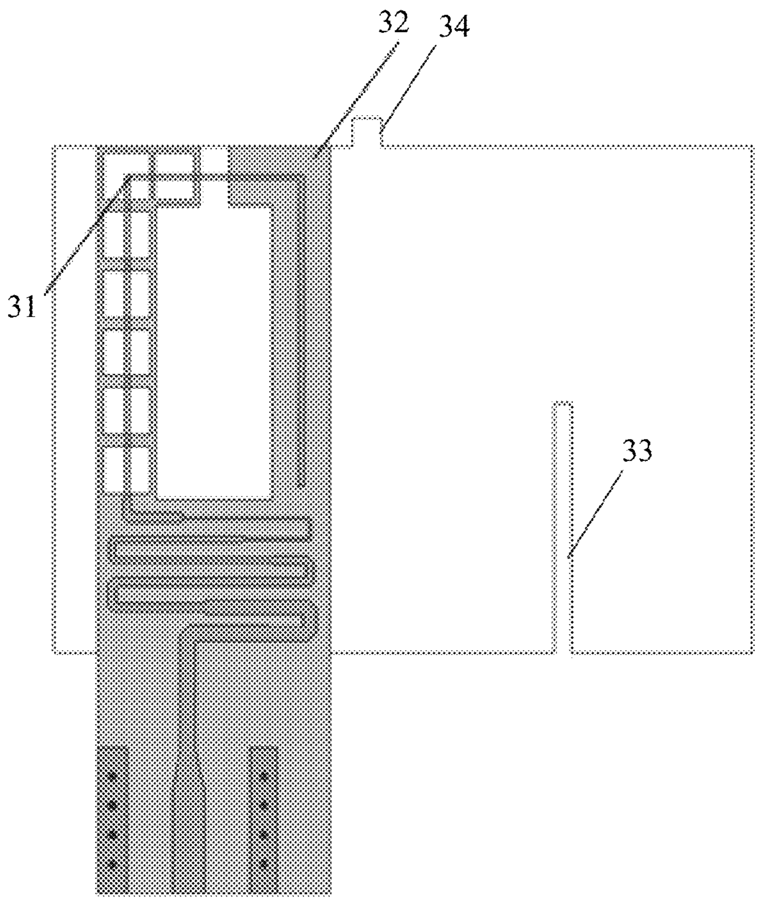
FIG. 7 is a schematic structural diagram of a third dielectric slab according to an embodiment.

The third dielectric slab 3 provided in this embodiment will be further described with reference to specific examples below. Refer to FIG. 7. FIG. 7 is a front view of a third dielectric slab according to a feasible embodiment. The third dielectric slab shown in FIG. 7 may be combined with the first dielectric slab shown in FIG. 5 and the second dielectric slab shown in FIG. 6 to form a tightly coupled array antenna. The third dielectric slab 3 adopts a rectangular structure, and a width of the third dielectric slab 3 in a vertical direction is 17.5 mm. It should be noted that, a dimension of the third dielectric slab introduced in this embodiment is merely an example. In a real-world application process, the dimension of each of the parts of the third dielectric slab may be set based on requirements, and the applicants make no excessive limitation herein.

The dipole antennas 111 in the first dielectric slab 1 shown in FIG. 2 are disposed perpendicular to each other. In this embodiment, each of the dipole antenna 111 is configured with a balun structure. Since the dipole antennas 111 are disposed perpendicular to each other, corresponding balun structures also need to be perpendicular to each other. Therefore, in some feasible embodiments, a gap structure 33 may be disposed on the third dielectric slab 3, and two third dielectric slabs 3 may be embedded together via the gap structure 33 that matches and corresponds to each other, to ensure that balun structures printed on the surface of the third dielectric slab 3 are perpendicular to each other. In this way, a correspondence between each of the balun structures and each of the dipole antennas 111 is implemented.

Optionally, to ensure stability of a tightly coupled array antenna structure, in some embodiments, a limiting protrusion 34 may be disposed at the top of the third dielectric slab 3, and correspondingly, an accommodating portion (not shown in the figure) is disposed on the surface of the first dielectric slab 1. During installation, the accommodating portion may be inserted into the limiting protrusion 34 to achieve a locking between the third dielectric slab 3 and the first dielectric slab 1, thereby ensuring a stable structure of the obtained tightly coupled array antenna.

Based on the technical solution shown above, the microstrip floor 32 is partially hollowed out. In the technical solution provided in this embodiment, the microstrip floor 32 is designed to be partially hollowed out, so that a diversity of current flowing on the microstrip floor 32 can be increased, and the cross-sectional area of the current path can also be reduced to increase the impedance real part, thereby achieving the objective of reducing the active standing wave of the tightly coupled array antenna. The shape of the hollow is not limited in this embodiment. For example, in some feasible embodiments, the shape of the hollow may be a regular polygon. Any shape of the hollow that can play a role of increasing the diversity of the current flowing on the microstrip floor 32 and also reducing the cross-sectional area of the current path to increase the impedance real part may be applied to the solution of this embodiment.

Based on the technical solution shown above, the tightly coupled array antenna may further include: reflection floor 4. The reflection floor 4 is disposed in parallel below the first dielectric slab 1. The reflection floor 4 not only can reflect and gather, on a receiving point, a signal received by the dipole antennas 111, which greatly enhances a receiving capability of the antennas and can achieve an objective of unidirectional radiation of the signal of each of the dipole antennas 111, the reflection floor 4 can also play a role of blocking and shielding other radiation signals from the back of the reflection floor 4, so as to prevent from being interfered.

Continuing with FIG. 1, in some embodiments, the tightly coupled array antenna may include the first dielectric slab 1, the second dielectric slab 2, the third dielectric slab 3, and the reflection floor 4. The reflection floor 4 is disposed in parallel below the first dielectric slab 1, and the reflection floor 4 is electrically connected to the balun structure. The reflection floor 4 in this embodiment refers to a floor that can reflect and gather, on a receiving point, the signal received by the dipole antennas 111, and block and shield other radiation signals from the back of the reflection floor 4. In some possible embodiments, the reflection floor 4 may be a metal plate.

To reduce an active standing wave of a tightly coupled array antenna, a second aspect provides a tightly coupled array antenna with a new structure. Specifically, continuing with FIG. 1, in the technical solution provided in this embodiment, the tightly coupled array antenna includes at least a first dielectric slab 1 and a second dielectric slab 2. The first dielectric slab 1, where a plurality of dipole antennas 111 are disposed on a lower surface of the first dielectric slab, the dipole antennas 111 are disposed at intervals, the plurality of dipole antennas 111 form one antenna unit 11, and a plurality of coupling structures 12 are disposed on an upper surface of the first dielectric slab 1. The second dielectric slab 2, disposed in parallel above the first dielectric slab 1, where a plurality of parasitic patches 21 are disposed on an upper surface of the second dielectric slab 2, and a center of each of the parasitic patches 21 coincides with a center of each of the coupling structures 12 in a vertical direction. In the technical solution provided in this embodiment, each of the parasitic patches 21 is loaded on each of the coupling structures 12, which is equivalent to introducing an inductance component. The inductance component can offset a capacitive reactance of the antenna unit 11 so that an impedance real part of the tightly coupled array antenna is smoother, and an active standing wave is reduced. To make the objectives, technical solutions, and advantages of this disclosure more clear, the following further describes in detail by taking a non-limiting embodiment as an example.

Continuing with FIG. 1, based on the technical solution described above, the tightly coupled array antenna further includes: A third dielectric slab 3, disposed on the lower surface of the first dielectric slab 1 and perpendicular to the first dielectric slab 1, where a feeding microstrip 31 is disposed on a first surface of the third dielectric slab 3, the first surface is perpendicular to the first dielectric slab 1, a microstrip floor 32 is disposed on a second surface of the third dielectric slab 3, the second surface is perpendicular to the first dielectric slab, and the feeding microstrip 31 and the microstrip floor 32 form a balun structure. In the technical solution of this embodiment, the feeding microstrip 31 and the microstrip floor 32 form the balun structure, and the balun structure can achieve an objective of balanced feeding and impedance matching, so that the active standing wave of the tightly coupled array antenna can be reduced.

Continuing with FIG. 1, based on the technical solution shown above, the microstrip floor 32 may be configured as partially hollowed out. In the technical solution of this embodiment, the microstrip floor 32 is designed to be partially hollowed out, so that a diversity of current flowing on the microstrip floor 32 can be increased, and a cross-sectional area of a current path can also be reduced to increase an impedance real part, thereby achieving an objective of reducing the active standing wave of the tightly coupled array antenna.

Figure 8:
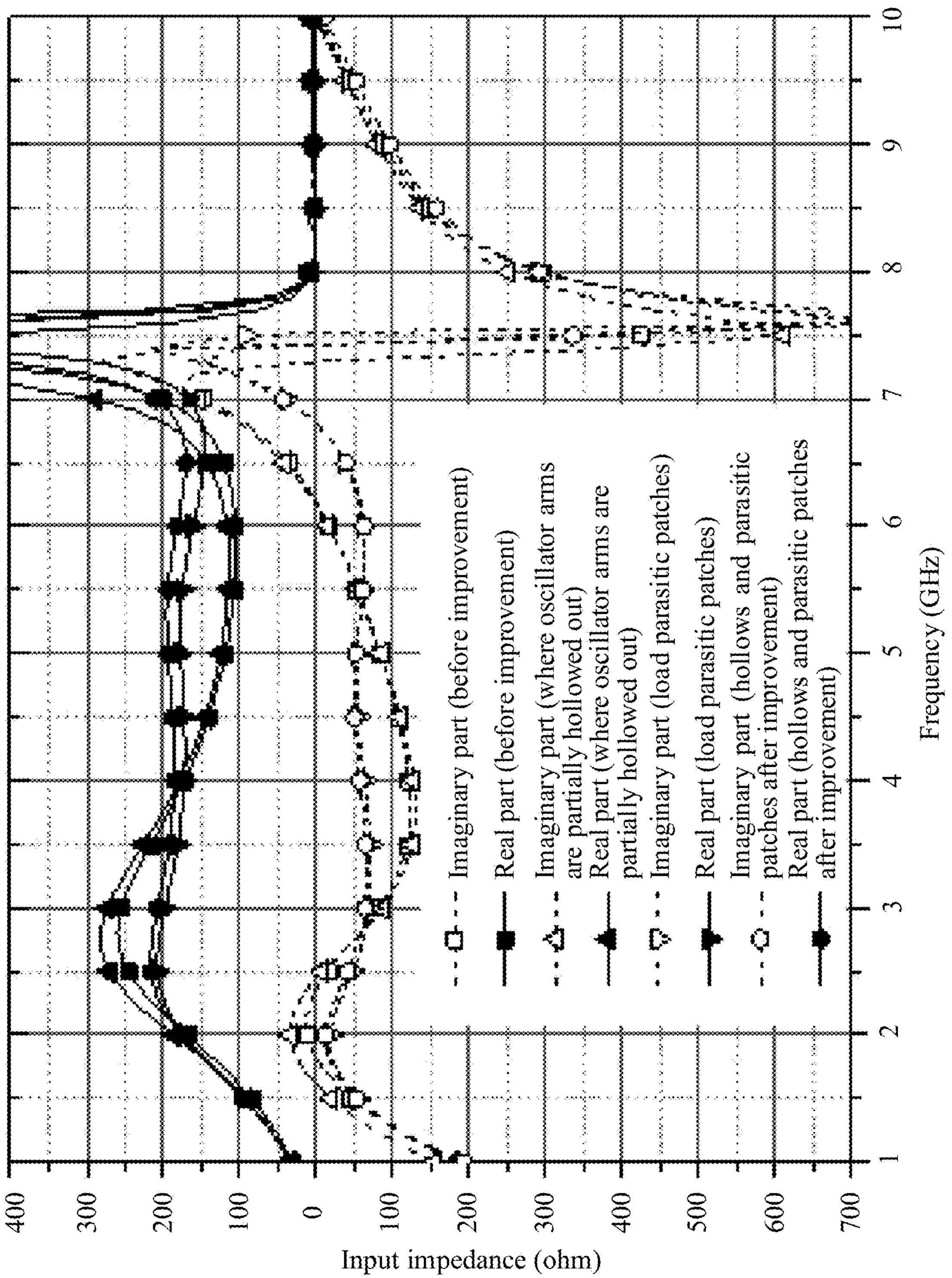
FIG. 8 shows variation curves of impedance real parts and imaginary parts of a tightly coupled array antenna before and after improvement.

Beneficial effects of the tightly coupled array antenna illustrated in this embodiment are further described below in conjunction with specific experimental data:

FIG. 8 shows variation curves of impedance real parts and imaginary parts of a tightly coupled array antenna before and after improvement based on a commercial electromagnetic simulation software. The tightly coupled array antenna before improvement is a tightly coupled array antenna where parasitic patches are not disposed and oscillator arms of dipole antennas do not adopt a hollow-out design. The tightly coupled array antenna after improvement is a tightly coupled array antenna where parasitic patches are disposed and/or oscillator arms of dipole antennas adopt a hollow-out design. It can be seen that, the impedance real part of the tightly coupled array antenna before improvement varies between 100 ohms and 250 ohms, and the impedance imaginary part varies between −120 ohms and 30 ohms. The impedance real part of the tightly coupled array antenna can be slightly increased by partially hollowing out the oscillator arms. By the design of loading the parasitic patches above the oscillator arms, a smoother variation of the impedance real and imaginary parts in a frequency band is evident. By simultaneously adopting the design of partially hollowing out the oscillator arms and loading parasitic patches above, the impedance real part in an operating frequency band of the tightly coupled array antenna is smoother, and both maintained at around 200 ohms.

Figure 9:
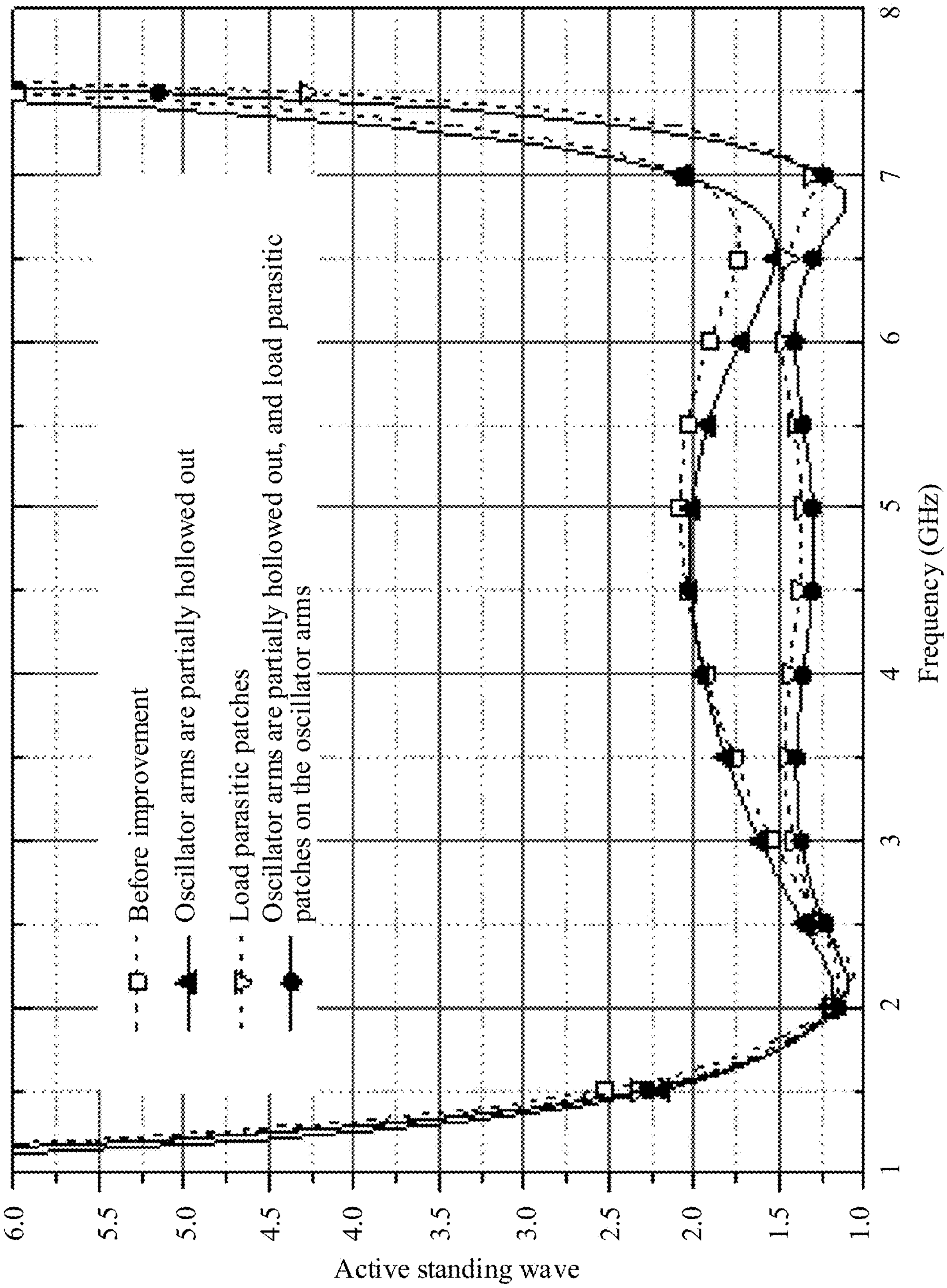
FIG. 9 shows variation curves of active standing waves with frequency of a tightly coupled array antenna before and after improvement.

FIG. 9 shows variation curves of active standing waves with frequency before and after improvement based on a commercial electromagnetic simulation software according to an embodiment of this application. The tightly coupled array antenna before improvement is a tightly coupled array antenna without a parasitic patch and a dipole antenna whose oscillator arms do not adopt a hollow-out design. The tightly coupled array antenna after improvement is a tightly coupled array antenna with a parasitic patch and/or a dipole antenna whose oscillator arms adopt a hollow-out design. It can be seen that the active standing waves of the tightly coupled array antenna in the operating frequency band before improvement is kept below 2.0. A slight improvement in the active standing waves at a high-frequency end by the design of partially hollowing out the oscillator arms. The active standing waves in the operating band are reduced to less than 1.5 by the design of loading parasitic patches on the oscillator arms. The active standing waves in the operating frequency band are reduced to less than 1.35 by simultaneously adopting the design of partially hollowing out the oscillator arms and loading the parasitic patches.

Figure 10:
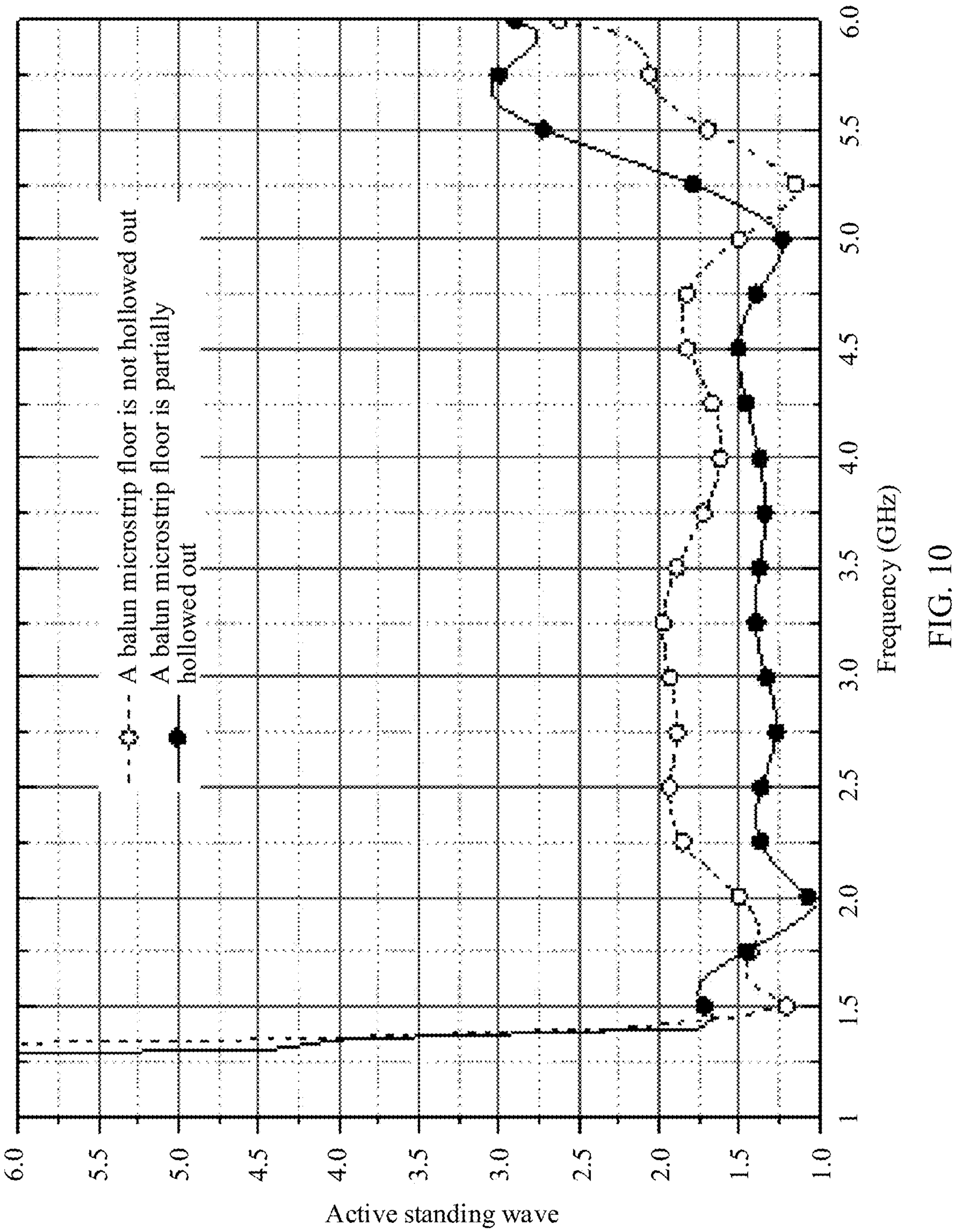
FIG. 10 shows variation curves of active standing waves with frequency when two balun structures are respectively used in a tightly coupled array antenna.

FIG. 10 shows variation curves of active standing waves with frequency when two balun structures are respectively used in a tightly coupled array antenna based on a commercial electromagnetic simulation software according to an embodiment of this application. The two balun structures are respectively a balun structure without a hollow-out design for the microstrip floor and a balun structure with a hollow-out design for the microstrip floor. In the balun structure, the tightly coupled array antenna of the microstrip floor without the hollow-out design keeps the active standing waves below 2.0 in the operating frequency band. In the balun structure, the tightly coupled array antenna of the microstrip floor with the hollow-out design keeps the active standing waves below 1.5 in the operating frequency band.

Figure 11:
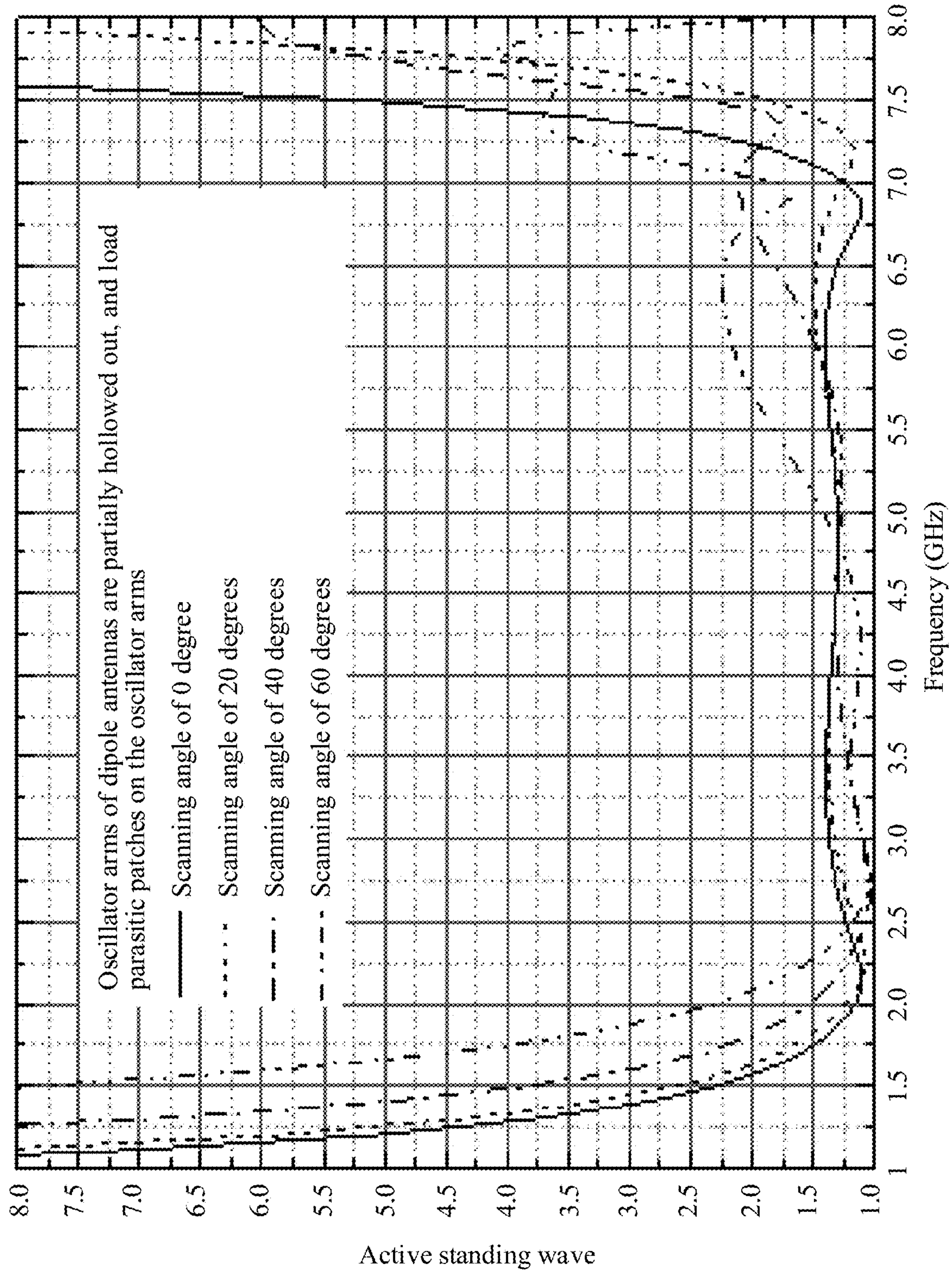
FIG. 11 shows an active standing wave scanning characteristic of a tightly coupled array antenna (without a balun structure) in a D-plane according to an embodiment of this disclosure.

FIG. 11 shows an active standing wave scanning characteristic of an ideally fed periodic tightly coupled array antenna in a D-plane according to an embodiment of this application. The D-plane is a main plane of the tightly coupled array antenna, that is, a plane whose scanning track is at an angle of 45 degrees to the oscillator arms. It can be seen that, in this application, an octave of 3.94:1 for active standing waves below 1.5 at an ideal feeding is reached. When a scanning angle is within 20 degrees, the octave of 4:1 for the active standing waves below 1.5 is reached. When the scanning angle is within 40 degrees, the octave of 3.77:1 for the active standing waves below 2.0 is reached. When the scanning angle is within 60 degrees, the octave of 3.5:1 for the active standing waves below 2.25 is reached.

Figure 12:
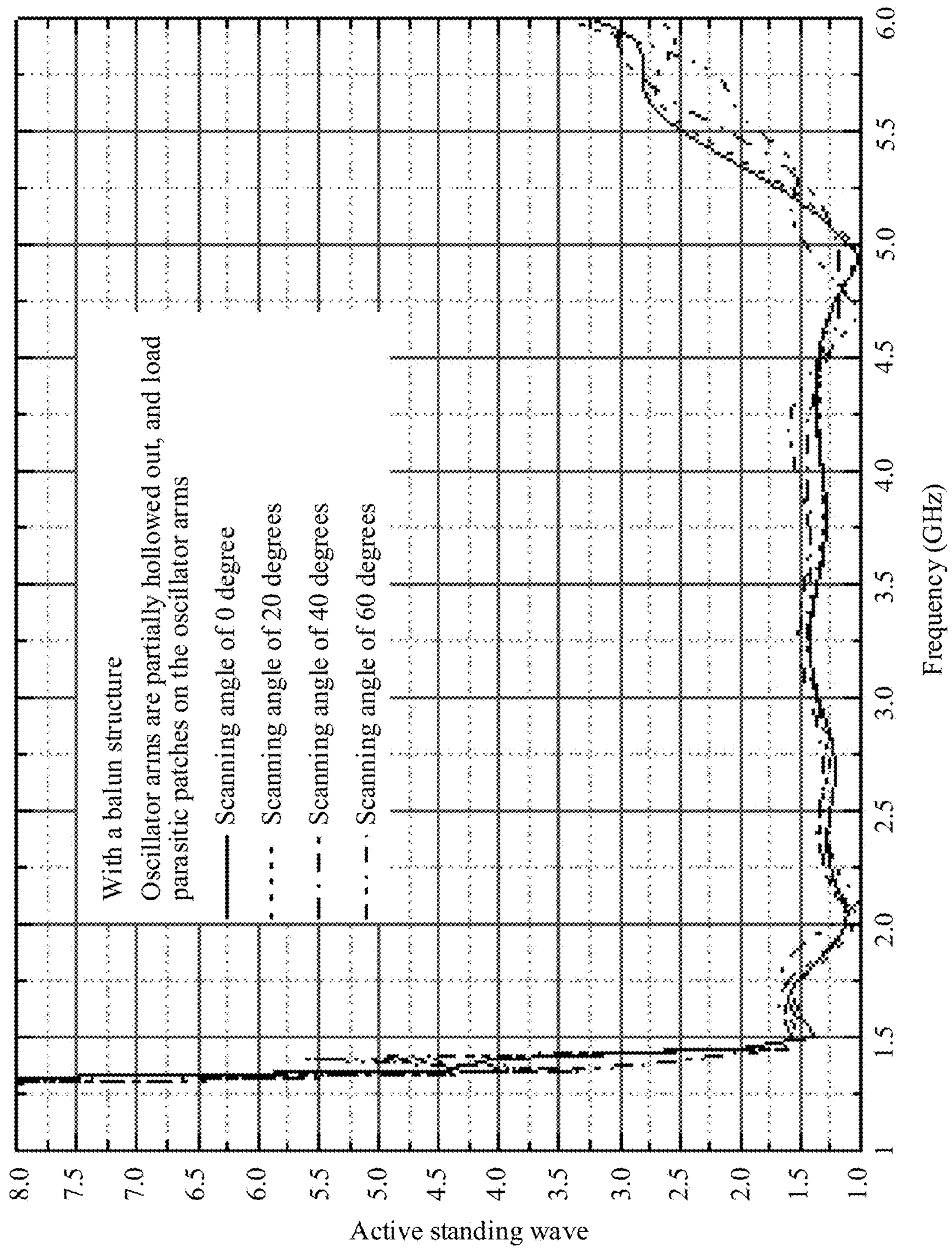
FIG. 12 shows an active standing wave scanning characteristic of a tightly coupled array antenna with a feeding balun in a D-plane according to an embodiment of this disclosure.

FIG. 12 shows an active standing wave scanning characteristic of a tightly coupled array antenna with a feeding balun in a D-plane according to an embodiment of this application. It can be seen that after the balun structure is added, when the scanning angle is within 0, 20, 40, and 60 degrees in a plane with an angle of 45 degrees to oscillators, the octave of 3.5:1 for the active standing waves below 1.5 is reached. In addition, the active standing waves on most frequencies in this frequency band remains below 1.5.

An embodiment further provides a network device. The network device may include the tightly coupled array antenna in the foregoing embodiment. The network device may implement a function of the network device in the foregoing embodiment.

The embodiments in this specification are all described in a progressive manner. For same or similar parts in the embodiments, reference may be made to each other. For example, for descriptions of the foregoing apparatus or device, refer to the corresponding method embodiments. The foregoing implementations of this disclosure are not intended to limit the protection scope thereof, which scope is defined in the accompanying claims.

What is claimed is:

1. A tightly coupled array antenna, comprising:

a first dielectric slab including a plurality of antenna units disposed on a lower surface of the first dielectric slab, each of the antenna units comprising at least two dipole antennas, each of the dipole antennas comprising at least two oscillator arms, each oscillator arm being partially hollowed out;

a plurality of coupling structures disposed on an upper surface of the first dielectric slab, the coupling structures being electrically connected to the antenna units; and a second dielectric slab disposed in parallel above the first dielectric slab, wherein a plurality of parasitic patches is disposed on an upper surface of the second dielectric slab, a center of each of the parasitic patches coincides with a center of each of the coupling structures in a vertical direction, and the center of each of the parasitic patches overlaps a feed point of a corresponding dipole antenna of the at least two dipole antennas.

2. The tightly coupled array antenna according to claim 1, further comprising:

a third dielectric slab disposed on the lower surface of the first dielectric slab and perpendicular to the first dielectric slab, wherein a feeding microstrip is disposed on a first surface of the third dielectric slab, the first surface being perpendicular to the first dielectric slab, a microstrip floor is disposed on a second surface of the third dielectric slab, the second surface being perpendicular to the first dielectric slab, the feeding microstrip and the microstrip floor forming a balun structure electrically connected to the dipole antennas.

3. The tightly coupled array antenna according to claim 2, wherein the microstrip floor is partially hollowed out.

4. The tightly coupled array antenna according to claim 2, further comprising:

a reflection floor disposed in parallel and underlying the first dielectric slab, wherein the reflection floor is electrically connected to the balun structure.

5. The tightly coupled array antenna according to claim 2, wherein the coupling structure comprises a first feeding plate and a second feeding plate connected by a connection portion, the first feeding plate and the second feeding plate being disposed perpendicular to each other.

6. The tightly coupled array antenna according to claim 2, wherein the upper surface of the first dielectric slab is spaced apart from the lower surface of the second dielectric slab by a preset distance.

7. A tightly coupled array antenna, comprising:

a first dielectric slab including a plurality of antenna units disposed on a lower surface of the first dielectric slab and a plurality of coupling structures disposed on an upper surface of the first dielectric slab, the coupling structures being electrically connected to the antenna units;

a second dielectric slab disposed in parallel above the first dielectric slab, a plurality of parasitic patches being disposed on an upper surface of the second dielectric slab, a center of each of the parasitic patches coincides with a center of each of the coupling structures in a vertical direction, and the center of each of the parasitic patches overlaps a feed point of a corresponding dipole antenna of the at least two dipole antennas; and a third dielectric slab disposed on the lower surface of the first dielectric slab and perpendicular to the first dielectric slab, wherein a feeding microstrip is disposed on a first surface of the third dielectric slab, the first surface being perpendicular to the first dielectric slab, a microstrip floor is disposed on a second surface of the third dielectric slab, the second surface being perpendicular to the first dielectric slab, the feeding microstrip and the microstrip floor forming a balun structure electrically connected to the antenna units.

8. The tightly coupled array antenna according to claim 7, wherein the microstrip floor is partially hollowed out.

9. A network device, comprising:

a first dielectric slab including a plurality of antenna units disposed on a lower surface of the first dielectric slab, each of the antenna units comprising at least two dipole antennas, each of the dipole antennas comprising at least two oscillator arms, each oscillator arm being partially hollowed out;

a plurality of coupling structures disposed on an upper surface of the first dielectric slab, the coupling structures being electrically connected to the antenna units; and a second dielectric slab disposed in parallel above the first dielectric slab, wherein a plurality of parasitic patches is disposed on an upper surface of the second dielectric slab, a center of each of the parasitic patches coincides with a center of each of the coupling structures in a vertical direction, and the center of each of the parasitic patches overlaps a feed point of a corresponding dipole antenna of the at least two dipole antennas.

10. The network device according to claim 9, further comprising:

a third dielectric slab disposed on the lower surface of the first dielectric slab and perpendicular to the first dielectric slab, wherein a feeding microstrip is disposed on a first surface of the third dielectric slab, the first surface being perpendicular to the first dielectric slab, a microstrip floor is disposed on a second surface of the third dielectric slab, the second surface being perpendicular to the first dielectric slab, the feeding microstrip and the microstrip floor forming a balun structure electrically connected to the dipole antennas.

11. The network device according to claim 10, wherein the microstrip floor is partially hollowed out.

12. The network device according to claim 10, further comprising:

a reflection floor disposed in parallel and underlying the first dielectric slab, wherein the reflection floor is electrically connected to the balun structure.

13. The tightly coupled array antenna according to claim 10, wherein the coupling structure comprises a first feeding plate and a second feeding plate connected by a connection portion, the first feeding plate and the second feeding plate being disposed perpendicular to each other.

14. The network device according to claim 10, wherein the upper surface of the first dielectric slab is spaced apart from the lower surface of the second dielectric slab by a preset distance.

15. The tightly coupled array antenna according to claim 2, further comprising:

a reflection floor disposed in parallel and underlying the first dielectric slab, wherein the reflection floor is electrically connected to the balun structure, and wherein the coupling structure comprises a first feeding plate and a second feeding plate connected by a connection portion, the first feeding plate and the second feeding plate being disposed perpendicular to each other.

16. The tightly coupled array antenna according to claim 15, wherein the upper surface of the first dielectric slab is spaced apart from the lower surface of the second dielectric slab by a preset distance.

17. The network device according to claim 10, further comprising:

a reflection floor disposed in parallel and underlying the first dielectric slab, wherein the reflection floor is electrically connected to the balun structure, and wherein the coupling structure comprises a first feeding plate and a second feeding plate connected by a connection portion, the first feeding plate and the second feeding plate being disposed perpendicular to each other.

* * * * *